United States Patent
Moon et al.

(10) Patent No.: US 12,437,759 B2
(45) Date of Patent: Oct. 7, 2025

(54) DIALOGUE MANAGEMENT METHOD, DIALOGUE MANAGEMENT SYSTEM, AND COMPUTER-READABLE RECORDING MEDIUM

(71) Applicants: Hyundai Motor Company, Seoul (KR); Kia Corporation, Seoul (KR)

(72) Inventors: Jaemin Moon, Yongin-Si (KR); Jungdo Kim, Seoul (KR); Minjae Park, Seongnam-Si (KR); Sungwang Kim, Seoul (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 248 days.

(21) Appl. No.: 18/227,629

(22) Filed: Jul. 28, 2023

(65) Prior Publication Data

US 2024/0127810 A1    Apr. 18, 2024

(30) Foreign Application Priority Data

Oct. 17, 2022    (KR) .................. 10-2022-0133510

(51) Int. Cl.
*G10L 15/22*     (2006.01)
*G06V 20/62*     (2022.01)
*G06V 30/10*     (2022.01)
*G10L 15/18*     (2013.01)

(52) U.S. Cl.
CPC .............. *G10L 15/22* (2013.01); *G06V 20/62* (2022.01); *G06V 30/10* (2022.01); *G10L 15/1815* (2013.01); *G06V 2201/02* (2022.01); *G10L 2015/225* (2013.01)

(58) Field of Classification Search
CPC ................. G10L 15/22; G10L 15/1815; G10L 2015/225; G10L 15/1822; G10L 2015/228; G10L 15/04; G10L 15/26; G06V 20/62; G06V 30/10; G06V 2201/02; G06V 30/1478; G06F 40/216; G06F 40/30; G06F 40/35
See application file for complete search history.

(56) References Cited

U.S. PATENT DOCUMENTS

| | | | |
|---|---|---|---|
| 10,521,189 B1 | 12/2019 | Ryabov et al. | |
| 10,755,702 B2 | 8/2020 | Robichaud et al. | |
| 2007/0286360 A1 | 12/2007 | Chu et al. | |
| 2018/0157638 A1* | 6/2018 | Li | G06F 40/35 |
| 2019/0034795 A1* | 1/2019 | Zitouni | G10L 15/22 |
| 2019/0206405 A1 | 7/2019 | Gillespie et al. | |
| 2020/0043478 A1 | 2/2020 | Lee | |
| 2020/0251098 A1* | 8/2020 | Metallinou | G10L 15/02 |
| 2021/0012765 A1 | 1/2021 | Weisz et al. | |
| 2021/0217408 A1* | 7/2021 | Hakkani-Tur | G06N 3/02 |

* cited by examiner

*Primary Examiner* — Abul K Azad
(74) *Attorney, Agent, or Firm* — Banner & Witcoff, Ltd.

(57) ABSTRACT

A dialogue management method, a dialogue management system and a non-transitory computer-readable recording medium may obtain, from a screen displayed via a user terminal, information required for executing a task corresponding to a user's speech input, and omit operations of inducing, receiving, and analyzing additional user's speech inputs.

19 Claims, 20 Drawing Sheets

USER TERMINAL (3)

FIG.10

< USER SPEECH ANALYSIS >

| DOMAIN | INTENT | SLOT |
|---|---|---|
| CALL | MAKING CALL | - |

< SCREEN INFORMATION ANALYSIS >

| TEXT ON SCREEN | CLASSIFICATION |
|---|---|
| 10:26 AM | HOUR (10), MIN (26) |
| feb. 19 | MONTH (2), DATE (19) |
| MOON JAE-MIN | NAME (MOON JAE-MIN) |
| WE JUST ARRIVED AT SEOUL STATION. WHEN ARE YOU GETTING HERE? | POI (SEOUL STATION) |
| . . . | . . . |

FIG.11

< SCREEN INFORMATION ANALYSIS >

| TEXT ON SCREEN | CLASSIFICATION |
|---|---|
| 10:26 AM | HOUR (10), MIN (26) |
| feb. 19 | MONTH (2), DATE (19) |
| MOON JAE-MIN | NAME (MOON JAE-MIN) |
| WE JUST ARRIVED AT SEOUL STATION. WHEN ARE YOU GETTING HERE? | POI (SEOUL STATION) |
| ... | ... |

< INTEGRATED ANALYSIS RESULT >

| DOMAIN | INTENT | SLOT |
|---|---|---|
| CALL | MAKING CALL | MOON JAE-MIN |

FIG.14

< SCREEN INFORMATION ANALYSIS >

| TEXT ON SCREEN | CLASSIFICATION |
|---|---|
| Jessica | NAME |
| 8:30 | HOUR (8), MIN (30) |
| PANGYO STATION, EXIT 1 | POI (PANGYO STATION, EXIT 1) |
| ... | ... |

< USER SPEECH ANALYSIS >

| DOMAIN | INTENT | SLOT |
|---|---|---|
| NAVIGATION | ROUTE GUIDANCE | - |

FIG.15

<SCREEN INFORMATION ANALYSIS>

| TEXT ON SCREEN | CLASSIFICATION |
|---|---|
| Jessica | NAME |
| 8:30 | HOUR (8), MIN (30) |
| PANGYO STATION, EXIT 1 | POI (PANGYO STATION, EXIT 1) |
| ... | ... |

<INTEGRATED ANALYSIS RESULT>

| DOMAIN | INTENT | SLOT |
|---|---|---|
| NAVIGATION | ROUTE GUIDANCE | PANGYO STATION, EXIT 1 |

FIG.18

< USER SPEECH ANALYSIS >

| DOMAIN | INTENT | SLOT |
|---|---|---|
| NAVIGATION | ROUTE GUIDANCE | - |

< SCREEN INFORMATION ANALYSIS >

| TEXT ON SCREEN | CLASSIFICATION |
|---|---|
| ROUTE GUIDANCE TO DOMESTIC TERMINAL AT GIMPO INTERNATIONAL AIRPORT STARTS | POI (DOMESTIC TERMINAL AT GIMPO INTERNATIONAL AIRPORT) |
| WHAT IS FINE DUST CONCENTRATION LEVEL TODAY? | WEATHER (FINE DUST) |
| 166 HWANGGEUM-RO, YANGCHON-EUP, GIMPO-SI | ADDRESS (166 HWANGGEUM-RO, YANGCHON-EUP, GIMPO-SI) |
| LINE 2, GEONDAN ORYU STATION, ORYU WANGGIL-DONG, INCHEON | ADDRESS (LINE 2, GEONDAN ORYU STATION, ORYU WANGGIL-DONG, INCHEON) |
| . . . | . . . |

FIG.19

< INTEGRATED ANALYSIS RESULT >

| DOMAIN | INTENT | SLOT |
|---|---|---|
| NAVIGATION | ROUTE GUIDANCE | 1. DOMESTIC TERMINAL AT GIMPO INTERNATIONAL AIRPORT<br>2. 166 HWANGGEUM-RO, YANGCHON-EUP, GIMPO-SI<br>3. LINE 2, GEONDAN ORYU STATION, ORYU WANGGIL-DONG, INCHEON |

< SCREEN INFORMATION ANALYSIS >

| TEXT ON SCREEN | CLASSIFICATION |
|---|---|
| ROUTE GUIDANCE TO DOMESTIC TERMINAL AT GIMPO INTERNATIONAL AIRPORT STARTS | POI (DOMESTIC TERMINAL AT GIMPO INTERNATIONAL AIRPORT) |
| WHAT IS FINE DUST CONCENTRATION LEVEL TODAY? | WEATHER (FINE DUST) |
| 166 HWANGGEUM-RO, YANGCHON-EUP, GIMPO-SI | ADDRESS (166 HWANGGEUM-RO, YANGCHON-EUP, GIMPO-SI) |
| LINE 2, GEONDAN ORYU STATION, ORYU WANGGIL-DONG, INCHEON | ADDRESS (LINE 2, GEONDAN ORYU STATION, ORYU WANGGIL-DONG, INCHEON) |
| ... | ... |

DIALOGUE MANAGEMENT METHOD, DIALOGUE MANAGEMENT SYSTEM, AND COMPUTER-READABLE RECORDING MEDIUM

CROSS-REFERENCE TO RELATED APPLICATION

This application is based on and claims priority to Korean Patent Application No. 10-2022-0133510, filed on Oct. 17, 2022 in the Korean Intellectual Property Office, the disclosure of which is incorporated herein by reference.

TECHNICAL FIELD

The disclosure relates to a dialogue management method, a dialogue management system and a non-transitory computer-readable recording medium that may process a user's speech.

BACKGROUND

A speech recognition technology may not be capable of identifying efficiently what is intended by a user from a user's speech and may require additional user's speeches before providing a service corresponding to what is intended by the user.

SUMMARY

A speech recognition technology may identify efficiently what is intended by a user from a user's speech without requiring additional user's speeches and provide a service corresponding to what is intended by the user, thereby controlling a specific device and providing specific information according to the user's intention.

A dialogue management technology may manage a dialogue with the user and perform various processing to provide a service corresponding to the user's intention.

The speech recognition technology and the dialogue management technology may be implemented as a speech recognition system and a dialogue management system, respectively. Also, the speech recognition system or the dialogue management system may be linked to a variety of user terminals, thereby providing a service intended or desired by the user. The user may request for a desired service by inputting a user's speech through a user terminal.

The present disclosure relates to a method for a dialogue management system. The method may comprise obtaining, by a communication module, an intent classification result and a slot tagging result from a user's speech; determining whether at least one parameter used for executing a task corresponding to the intent classification result is obtained; analyzing, based on determining that the at least one parameter is not obtained, screen information displayed on a user terminal; integrating a result of the analyzing screen information, the intent classification result, and the slot tagging result; and generating, based on the integrating, a feedback on the user's speech.

BRIEF DESCRIPTION OF THE DRAWINGS

These and/or other features of the disclosure will become apparent and more readily appreciated from the following descriptions, taken in conjunction with the accompanying drawings of which:

FIG. 10 shows an example analysis result of a user's speech and an analysis result of screen information performed in a dialogue management system;

FIG. 11 shows an example result of integrating an analysis result of a user's speech and an analysis result of screen information performed in a dialogue management system;

FIG. 14 shows an example analysis result of a user's speech and an analysis result of screen information performed in a dialogue management system;

FIG. 15 shows an example result of integrating an analysis result of a user's speech and an analysis result of screen information performed in a dialogue management system;

FIG. 18 shows an example analysis result of a user's speech and an analysis result of screen information performed in a dialogue management system;

FIG. 19 shows an example result of integrating an analysis result of a user's speech and an analysis result of screen information performed in a dialogue management system.

DETAILED DESCRIPTION

Figure 1:
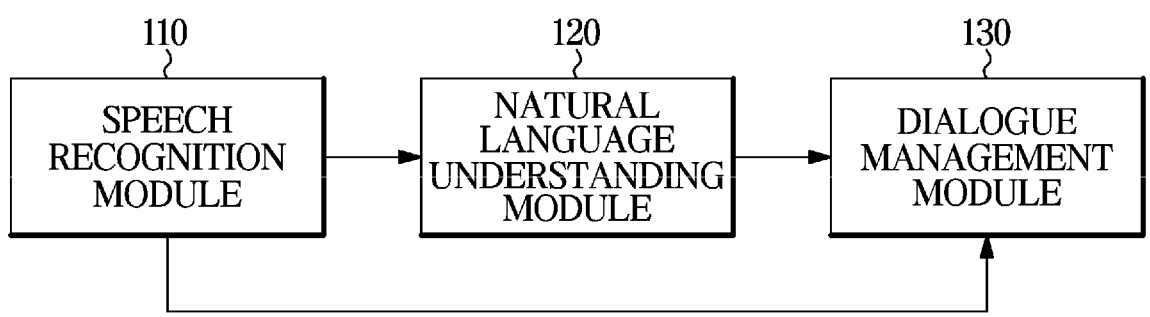
FIG. 1 shows example constituent components used for processing a user's input speech.

The features of the present disclosure are only examples, so it should be understood that they may be replaced with various equivalents and modifications at the time of the present disclosure.

Like reference numerals throughout the specification denote like elements.

Terminologies used herein are for the purpose of describing particular examples only and is not intended to limit the present disclosure.

It is to be understood that the singular forms are intended to include the plural forms as well, unless the context clearly dictates otherwise.

It will be further understood that the terms "include", "comprise" and/or "have" if used in this specification, specify the presence of stated features, integers, steps, operations, elements, and/or components, but do not preclude the presence or addition of one or more other features, integers, steps, operations, elements, components, and/or groups thereof.

It will be understood that, although the terms first, second, etc. may be used herein to describe various elements, these elements should not be limited by these terms. For example, without departing from the technical spirit or examples of the disclosure, a first element may be referred to as a second element, and also a second element may be referred to as a first element.

The term "and/or" includes any and all combinations of one or more of the associated listed items.

Further, the terms such as "part", "~device", "~block", "~member", "~module", and the like may refer to a unit for processing at least one function or act. For example, the terms may refer to at least a process processed by at least one hardware component, such as a field-programmable gate array (FPGA) and/or circuit (e.g., an application specific integrated circuit (ASIC)), or software (e.g., program) stored in memories or processors.

Reference numerals used for method steps are just used for convenience of explanation, but not to limit an order of the steps. Thus, unless the context clearly dictates otherwise, the written order may be practiced otherwise.

The term "at least one" used herein includes any and all combinations of the associated listed items. For example, it should be understood that the term "at least one of A, B, or C" may include only A, only B, only C, both A and B, both A and C, both B and C, or all of A, B and C.

Hereinafter, examples of the disclosure are described in detail with reference to the accompanying drawings.

Figure 2:
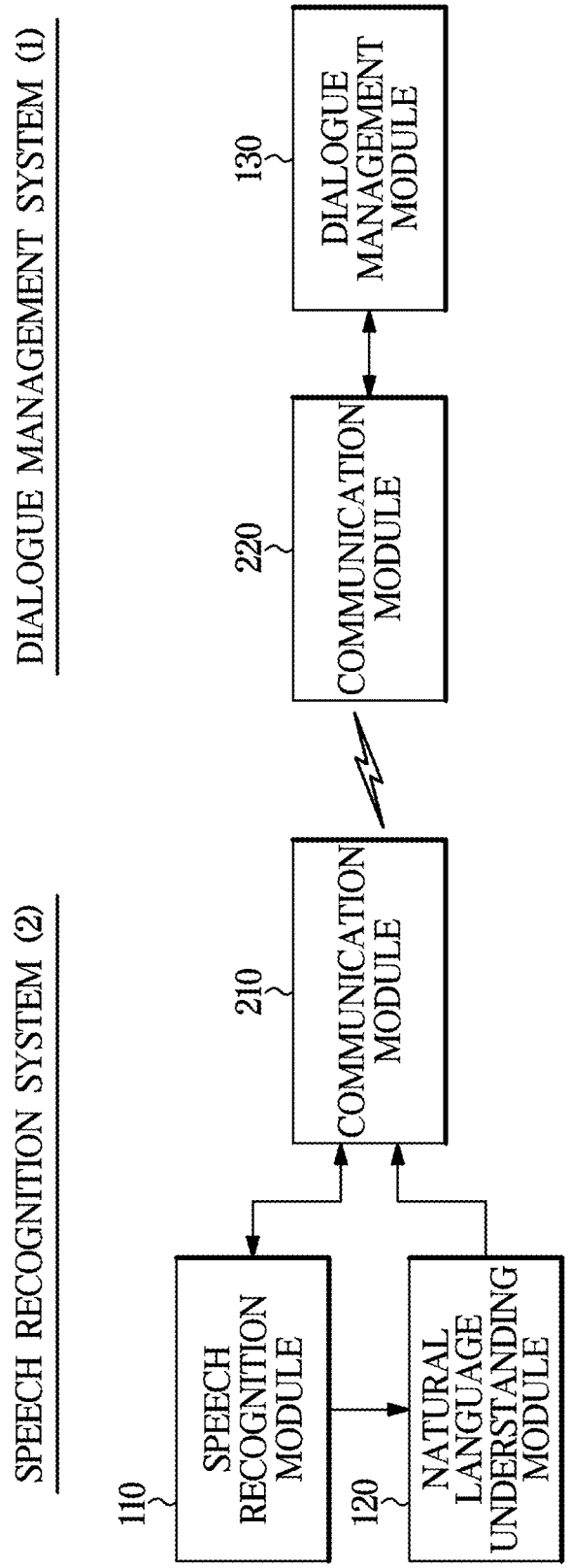
FIG. 2 shows an example where constituent components used for processing a user's input speech are included in different systems.

FIG. 1 shows example constituent components used for processing a user's input speech. FIG. 2 shows an example where constituent components used for processing a user's input speech are included in different systems.

A speech recognition module 110 may be implemented with a speech to text (STT) engine, and perform conversion into text by applying a speech recognition algorithm to the user's speech.

For example, the speech recognition module 110 may extract feature vectors from a user's speech by applying a feature vector extraction method such as a cepstrum, a linear predictive coefficient (LPC), a Mel frequency cepstral coefficient (MFCC), a filter bank energy, or the like.

Also, a recognition result may be obtained by comparing extracted feature vectors and trained reference patterns. To this end, an acoustic model for modeling and comparing signal characteristics of voice or a language model for modeling a linguistic order of recognition vocabulary such as words or syllables may be used.

In addition, the speech recognition module 110 may convert the user's speech into text based on learning where deep learning or machine learning is applied. For example, a way of converting the user's speech into the text by the speech recognition module 110 is not limited thereto, and a variety of speech recognition techniques may be applied to convert the user's speech into the text.

A natural language understanding module 120 may apply a natural language understanding (NLU) technique to determine a user intention included in the text. Accordingly, the natural language understanding module 120 may include an NLU engine that is capable of determining the user intention by applying the NLU technique to an input sentence. Here, the text output by the speech recognition module 110 may be a sentence that is input to the natural language understanding module 120.

For example, the natural language understanding module 120 may recognize an entity from the input sentence. The entity is a proper noun such as a name of an individual person, place, organization, time, day, currency, and the like. Named-entity recognition (NER) may identify an entity in a sentence and classifying a type of the identified entity. A keyword may be extracted from a sentence through named-entity recognition to understand the meaning of the sentence.

Also, the natural language understanding module 120 may determine a domain from the input sentence. The domain may identify a subject matter of the user's speech. For example, domains representing various subject matters such as a vehicle control, schedule, call, information about weather or traffic conditions, text transmission, navigation, music, etc., may be determined based on the input sentence.

The natural language understanding module 120 may classify an intent corresponding to the input sentence and fill a slot required to execute a task corresponding to the corresponding intent. The natural language understanding module 120 may extract an entity from the input sentence for slot filling.

A slot required to execute a task corresponding to an intent may be filled by an entity extracted from the input sentence, which is referred to as 'slot filling'.

For example, if the input sentence is "turn on the air conditioner", a domain may be [vehicle control], and an intent may be [turning on air conditioner]. In the example, a slot required to execute a task corresponding to the corresponding intent may be [temperature, air volume].

As another example, if the input sentence is "play me a song", a domain may be [music], an intent may be [music playback], and a slot required to execute a task corresponding to the corresponding intent may be [artist, song name].

However, classification criteria, names, etc., of a domain and an intent may vary depending on a design. Accordingly, modules that perform operations to be described later may be encompassed by a scope of the disclosure, regardless of the used names, classification criteria, etc., of domain and intent.

Meanwhile, the natural language understanding module 120 may also extract information such as a domain, an intent, an entity, and the like, from the input sentence based on a model trained by deep learning or machine learning, like the speech recognition module 110. However, examples of the disclosure are not limited thereto, and a way of extracting required information from an input sentence by the natural language understanding module 120 is not limited.

A dialogue management module 130 may generate a feedback to be output to a user terminal, based on dialogue management policies and an analysis result (results of STT and NLU) of the user's speech performed in the speech recognition module 110 and the natural language understanding module 120, respectively.

For example, the dialogue management module 130 may store a dialogue history with the user, and determine whether a dialogue is currently ongoing (extension of a previous dialogue) or a new dialogue begins based on the stored dialogue history. Even if the same user's speech is input, different feedback may be generated depending on whether a dialogue is ongoing.

Also, the dialogue management module 130 may determine whether information required to execute a task corresponding to the intent classified by the natural language understanding module 120 is sufficient. For example, if all entities corresponding to an intent are extracted, a message that guides task execution may be output and processing for executing the corresponding task may be performed.

Furthermore, depending on design, even though all the entities required to execute the task corresponding to the intent are not extracted, if the task is executable based on an entity of default value, the corresponding task may be executed according to the entity of default value.

If all the entities for task execution are not obtained, a system speech for inquiring information about an entity required by a user may be generated and output, and required information may be obtained from a screen displayed on the user terminal, which will be described in detail later.

Also, if a task is not executable even though all the entities are obtained, a message notifying that the task is not executable may be output to the user.

For example, the above-described speech recognition module 110, the natural language understanding module 120 and the dialogue management module 130 may be implemented as a single dialogue management system 1. In this case, if a user's speech is input to the dialogue management system 1 including the speech recognition module 110, the natural language understanding module 120 and the dialogue management module 130, the dialogue management system 1 may obtain an analysis result of the user's speech through speech recognition and natural language understanding, and generate a feedback on the user's speech based on the obtained analysis result.

As another example, as shown in FIG. 2, the speech recognition module 110 and the natural language understanding module 120 may be included in a speech recognition system 2, and the dialogue management module 130 may be included in the dialogue management system 1 which is a separate system. The names of the dialogue management system 1 and the speech recognition system 2 are arbitrarily provided, and thus, as long as the dialogue management system 1 and the speech recognition system 2 may perform operations to be described below, the dialogue management system 1 and the speech recognition system 2 may be encompassed by a scope of the disclosure, regardless of the name.

For example, a separate system may refer to a system implemented by a separate server. Also, a separate system may be operated by different operating entities.

For example, being implemented as a single system does not necessarily mean being implemented by a single server. For example, each of the speech recognition system 2 and the dialogue management system 1 may be implemented by a plurality of servers.

If a user's speech is transmitted to the speech recognition system 2, the speech recognition module 110 and the natural language understanding module 120 may output an analysis result of the user's speech, and the output analysis result may be transmitted to the dialogue management system 1 through a communication module 210 provided in the speech recognition system 2.

If a communication module 220 provided in the dialogue management system 1 receives the analysis result of the user's speech, the dialogue management module 130 may generate a feedback on the user's speech based on the analysis result and dialogue management policies.

The feedback on the user's speech may include a system response including a processing signal for task execution and a system speech.

Alternatively, the user's speech may be transmitted to the dialogue management system 1 first, and then the dialogue management system 1 may transmit the user's speech to the speech recognition system 2. If the speech recognition system 2 outputs an analysis result of the user's speech, the dialogue management system 1 may generate a feedback on the user's speech based on the analysis result and dialogue management policies. The generated feedback may be transmitted to the user terminal.

The communication module 220 provided in the dialogue management system 1 and the communication module 210 provided in the speech recognition system 2 may wirelessly communicate with a base station or an access point (AP), and exchange data with external devices through the base station or access point.

For example, the communication modules 210 and 220 may wirelessly communicate with an access point using Wi-Fi (Wi-Fi®, IEEE 802.11 standard), or communicate with a base station using a code division multiple access (CDMA), wideband CDMA (WCDMA), global system for mobile communication (GSM), long term evolution (LTE), 5G, Wibro, and the like.

Also, the communication modules 210 and 220 may directly communicate with external devices. For example, the communication modules 210 and 220 may exchange data with external devices in a short distance using a Wi-Fi direct, Bluetooth (Bluetooth®, IEEE 802.15.1 standard), Zigbee (Zigbee®, IEEE 802.15.4 standard), etc.

The dialogue management system 1 and the speech recognition system 2 may include at least one memory storing a program performing the aforementioned operations or operations to be described later and at least one processor implementing a stored program.

In the speech recognition system 2, the speech recognition module 110 and the natural language understanding module 120 may use separate memories and processors, or share a memory and a processor.

Alternatively, the speech recognition module 110 may be included in the speech recognition system 2, and the natural language understanding module 120 and the dialogue management module 130 may be included in the dialogue management system 1.

Alternatively, the speech recognition module 110, the natural language understanding module 120 and the dialogue management module 130 may be implemented as separate systems, respectively. In this case, the speech recognition module 110 may be implemented as a speech recognition system, the natural language understanding module 120 may be implemented as a natural language understanding system, and the dialogue management module 130 may be implemented as a dialogue management system.

Figure 3:
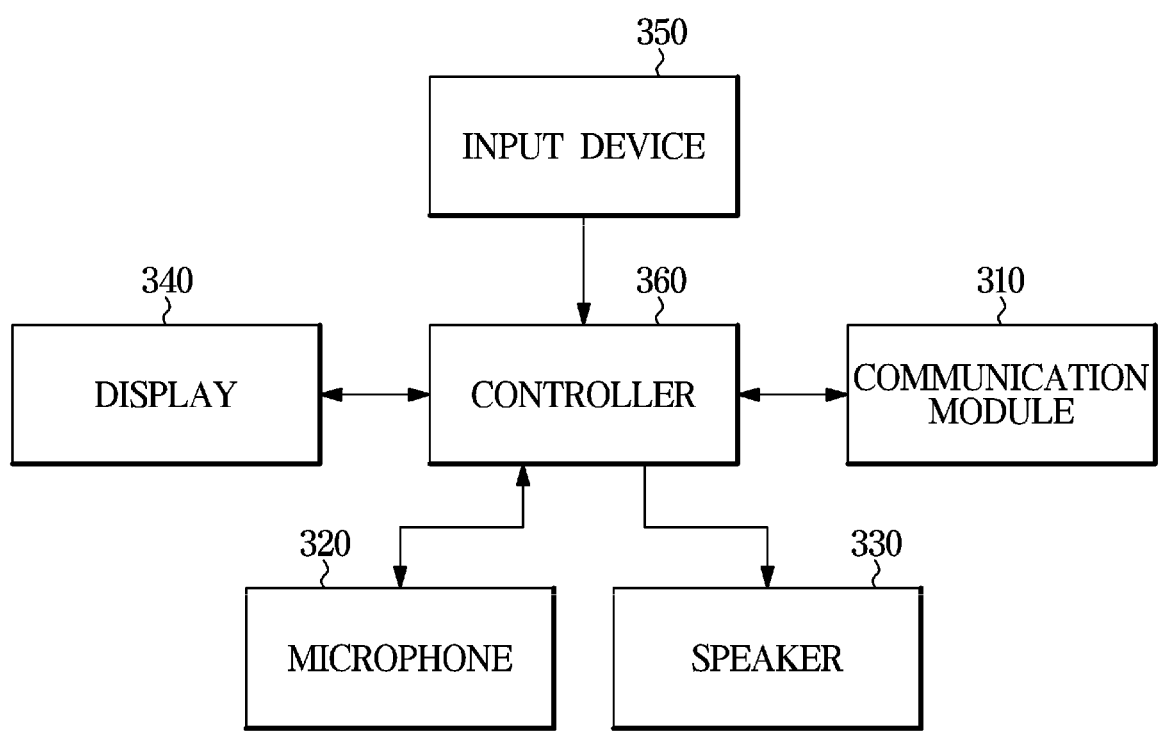
FIG. 3 shows example constituent components of a user terminal.
Figure 4:
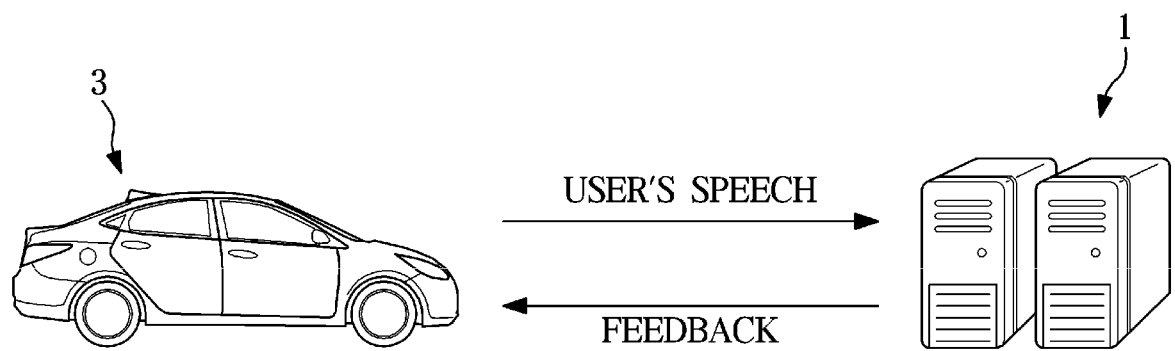
FIGS. 4 and 5 shows example information exchanged between a user terminal and a dialogue management system.
Figure 5:
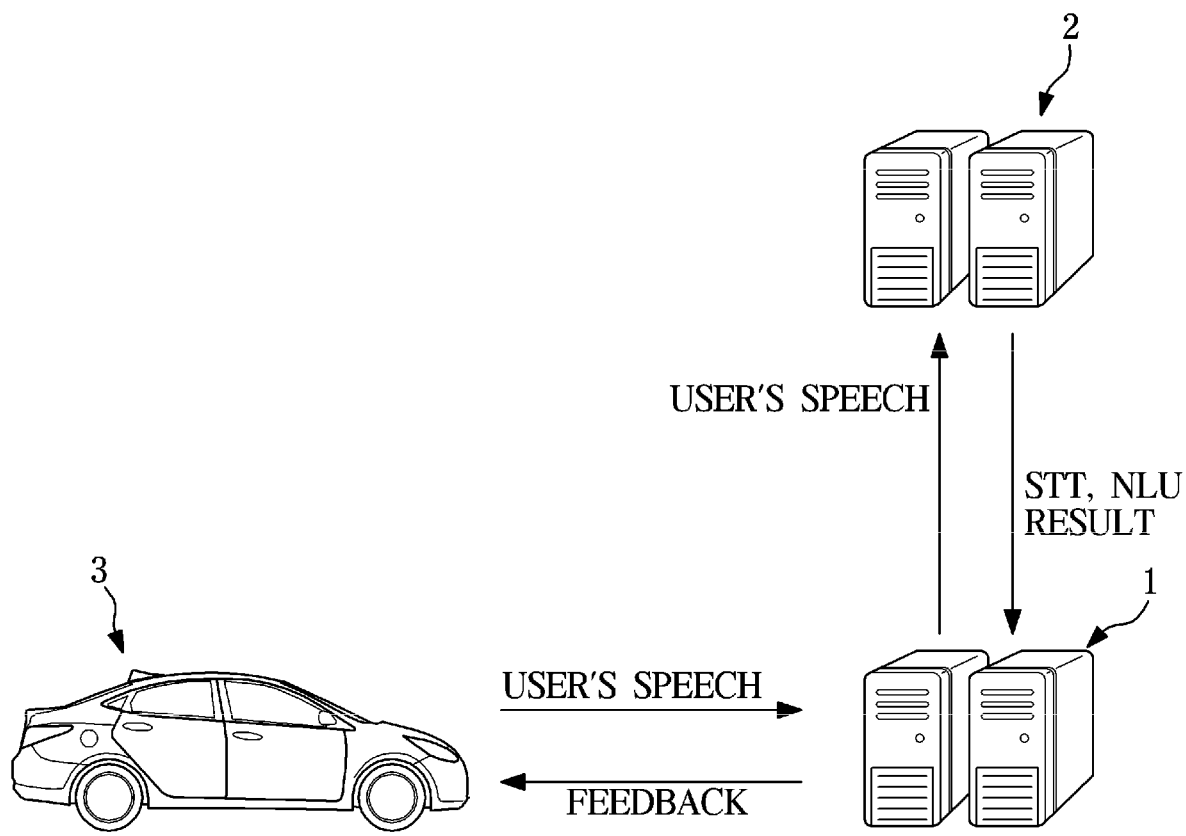

FIG. 3 shows example constituent components of a user terminal. FIGS. 4 and 5 show example information exchanged between a user terminal and a dialogue management system.

A user terminal is an electronic device that serves as a gateway between a user and the dialogue management system 1 or the speech recognition system 2. The user terminal may include various interface devices for receiving a user's speech and outputting a feedback on the user's speech, and communication devices configured for communicating with the dialogue management system 1 or the speech recognition system 2.

For example, the user terminal may be a mobile device such as a smartphone, a tablet PC, a laptop, etc., a wearable device such as a smartwatch, smartglasses, etc., home appliances including a microphone and a speaker such as a television, refrigerator, air conditioner, air purifier, vacuum cleaner, washing machine, etc., or smart speaker (artificial intelligence (AI) speaker).

Alternatively, the user terminal may be a vehicle. A user's speech may be input through a microphone provided in the vehicle and be transmitted to the dialogue management system 1 or the speech recognition system 2 through a communication module provided in the vehicle. Also, if a feedback is transmitted form the dialogue management system 1, a speaker, a display, or other constituent components provided in the vehicle may be controlled to execute a task corresponding to an intent.

Referring to FIG. 3, a user terminal 3 (e.g., vehicle) may include a communication module 310, a microphone 320, a speaker 330, a display 340, an input device 350, and a controller 360 controlling constituent components of the user terminal 3.

The communication module 310 may include a wireless communication module exchanging data with external devices wirelessly. Also, the communication module 310 may further include a wired communication module exchanging data with external devices by wire.

The wired communication module may exchange data with external devices connected through a universal serial bus (USB) terminal, an auxiliary (AUX) terminal, and the like.

The wireless communication module may wirelessly communicate with a base station or an access point (AP), and exchange data with external devices through a base station or an access point.

For example, the wireless communication module may wirelessly communicate with an access point using Wi-Fi (Wi-Fi®, IEEE 802.11 standard), or communicate with a base station using a CDMA, WCDMA, GSM, LTE, 5G, Wibro, and the like.

Also, the wireless communication module may directly communicate with external devices. For example, the wireless communication module may exchange data with external devices in a short distance using a Wi-Fi direct, Bluetooth (Bluetooth®, IEEE 802.15.1 standard), Zigbee (Zigbee®, IEEE 802.15.4 standard), etc.

For example, if the user terminal 3 is implemented as a vehicle, the communication module 310 may communicate with a mobile device located inside the vehicle through a Bluetooth communication, thereby receiving information (e.g., user images, user speech, contact numbers, schedules, etc.) obtained by or stored in the mobile device. The communication module 310 may communicate with the dialogue management system 1 or the speech recognition system 2 through Wi-Fi, 4G or 5G communication, thereby transmitting a user's speech and receiving an analysis result of the user's speech.

A user's speech may be input to the microphone 320. If the user terminal 3 is implemented as a vehicle, a user may be a driver or an occupant. The microphone 320 may be provided on a steering wheel, a center fascia, a headliner, or a rear-view mirror, etc., to receive a speech command from the driver or a front occupant.

Also, two or more microphones 320 may be provided. In this case, as described above, a first microphone may be provided to receive a driver's speech command, and a second microphone may be provided to receive a rear occupant's speech command, for example, be provided on at least one of a rear armrest, rear doors, B pillar or C pillar, or headliner of the vehicle.

The speaker 330 may output a variety of audios related to a system response received from the dialogue management system 1. The speaker 330 may output a system speech transmitted from the dialogue management system 1, and output a content signal corresponding to the system response.

Regardless of a system response, music, radio or audio of multimedia content may be output, and audios for route guidance while a navigation function is operating may be output.

The display 340 may display various information related to a system response received from the dialogue management system 1. The display 340 may display a system speech, output through the speaker 330, as text, and if a user selection from a plurality of items is required to execute a task corresponding to a user's speech, display a list of the plurality of items.

Also, the display 340 may display a message notifying the user of execution of the task corresponding to the user's speech.

In addition, the display 340 may display information required to perform other functions of the user terminal 3, such as outputting multimedia content, regardless of system response.

For example, if the user terminal 3 is implemented as a vehicle, the display 340 may include an audio, video, navigation (AVN) display provided on a center fascia of the vehicle, a cluster display, or a head-up display (HUD).

Alternatively, the display 340 may include a rear seat display provided on a back of the front seat's headrest so that a rear occupant may see the rear seat display. If the vehicle is a multi-seater vehicle, the display 340 may include a display mounted on a headliner of the vehicle.

The display 340 may be provided anywhere as long as users inside the vehicle may see the display 340, and the position or the number of displays 340 are not limited.

The user terminal 3 may include the input device 350 for manually receiving a user command, in addition to the microphone 320. The input device 350 may be provided as a jog shuttle, a button or a touchpad. If the input device 350 is provided as a touchpad, the input device 350 together with the display 340 may be implemented as a touchscreen.

For example, if the user terminal 3 is implemented as a vehicle, the input device 350 may include an input device provided as a jog shuttle or a button, in an area where an AVN is provided on a center fascia, in an area where a gearbox is provided, or on a steering wheel.

Also, to receive a control command related to passenger seats, the input device 350 may include an input device provided on each door of the vehicle, and an input device provided on a front armrest or a rear armrest.

The controller 360 may control the constituent components of the user terminal 3 so that operations to be described below are performed.

In an example where the user terminal 3 is implemented as a vehicle and the speech recognition module 110, the natural language understanding module 120 and the dialogue management module 130 are all included in the dialogue management system 1, as shown in FIG. 4, a user's speech input through the microphone 320 of the user terminal 3 may be transmitted to the dialogue management system 1 through the communication module 310.

If the communication module 220 of the dialogue management system 1 receives the user's speech and the speech recognition module 110 and the natural language understanding module 120 output an analysis result of the user's speech, the dialogue management module 130 may generate an appropriate system response based on the analysis result of the user's speech and transmit the system response to the user terminal 3 through the communication module 220.

Alternatively, in an example where the user terminal 3 is implemented as a vehicle and the speech recognition system 2 and the dialogue management system 1 are implemented as separate systems, as shown in FIG. 5, a user's speech input through the microphone 320 of the user terminal 3 may be transmitted to the dialogue management system 1 through the communication module 310.

The dialogue management system 1 may transmit the user's speech to the speech recognition system 2 and receive an analysis result (results of STT and NLU) of the user's speech from the speech recognition system 2.

The dialogue management module 130 may generate an appropriate feedback based on the analysis result of the user's speech, and transmit the feedback to the user terminal 3 through the communication module 220.

Alternatively, the user terminal 3 may transmit the user's speech to the speech recognition system 2. In this case, the speech recognition system 2 may transmit the analysis result of the user's speech to the dialogue management system 1, and the dialogue management system 1 may transmit a feedback corresponding to the transmitted analysis result to the user terminal 3 directly, or through the speech recognition system 2.

As described above, the natural language understanding module 120 may output results of domain classification, intent classification, and slot tagging by analyzing the user's speech. A slot represents meaningful information related to an intent corresponding to a user's speech, and an entity or parameter extracted from the user's speech may be used to fill a slot. Slot filling refers to filling a slot for an intent using a parameter.

A slot may be defined by a type to which the value belongs, a role in a sentence, and a value. For example, in a sentence of "let's go to Busan station from Seoul station", 'Seoul station' and 'Busan station' correspond to the same type of slot. However, in the sentence, their roles are different in that 'Seoul station' is a starting point and 'Busan station' is a destination.

Meanwhile, the dialogue management module 130 may generate a feedback corresponding to the user's speech based on the result output from the natural language understanding module 120. For example, if an intent corresponding to the user's speech is a request for task execution, the dialogue management module 130 may generate a feedback to execute the corresponding task.

To this end, the dialogue management module 130 may determine whether at least one parameter related to task execution is included in the user's speech.

The least one parameter related to task execution may include a required parameter and an optional parameter. The required parameter is information necessarily required for task execution, and the optional parameter is information that is not necessarily required for task execution, but may be referred to if included in the user's speech.

If the optional parameter is not included in the user's speech, a default value may be applied. If the required parameter is not included in the user's speech, however, the task is not executable, and thus an additional dialogue is required to obtain the required parameter from a user.

For example, however, by obtaining a required parameter from a screen displayed on the display 340 of the user terminal 3, the task desired by the user may be executed without an additional dialogue. Detailed operations related to the above are described below.

Furthermore, even if an optional parameter is not included in a user's speech, a task may be executed by obtaining the optional parameter from the screen displayed on the display 340 of the user terminal 3 and applying the obtained optional parameter instead of a default value.

Figure 6:
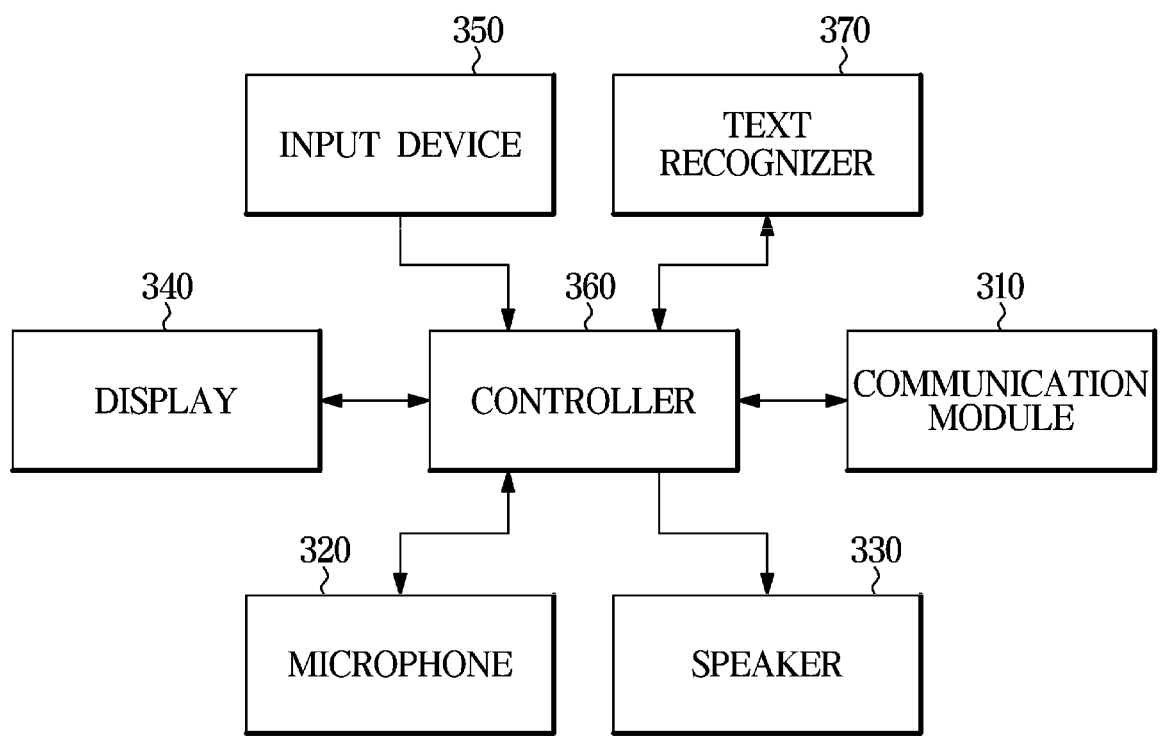
FIG. 6 shows example operations of a vehicle.
Figure 7:
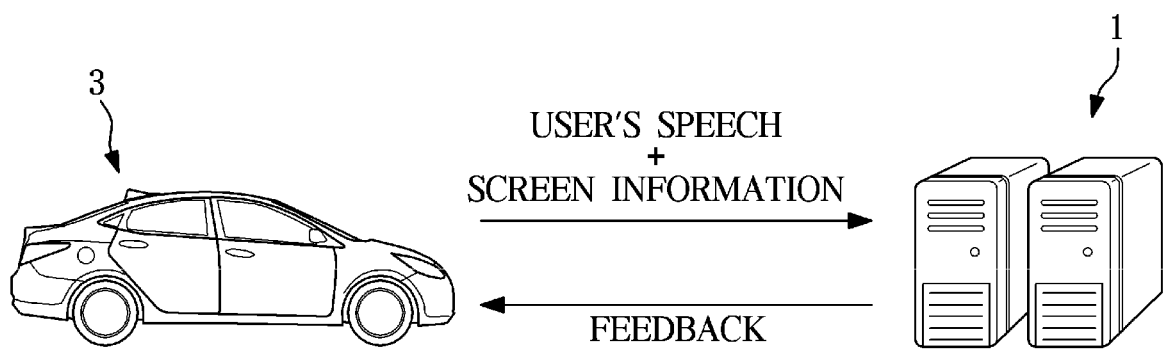
FIG. 7 shows example information exchanged between a user terminal and a dialogue management system.

FIG. 6 shows example operations of a vehicle. FIG. 7 shows example information exchanged between a user terminal and a dialogue management system.

In the below-described example, the vehicle is a user terminal 3.

Referring to FIG. 6, the user terminal 3 (e.g., vehicle) may further include a text recognizer 370 in addition to the above-described constituent components.

The text recognizer 370 may recognize text included in an image. For example, the text recognizer 370 may employ an optical character recognition (OCR) technology.

The controller 360 may scan a screen displayed on the display 340 at a point in time that a user's speech is input to the microphone 320, and store as a scan image.

Also, if a screen displayed on the display 340 changes, the controller 360 may periodically scan a screen from the point in time that the user's speech is input to the microphone 320 to a point in time that the dialogue management system 1 requests the user terminal 3 for a text recognition result, or scan a screen each time a screen is changed.

The text recognizer 370 may recognize text from the stored scan image.

Furthermore, the text recognizer 370 may perform image recognition as well as text recognition.

According to an example, by recognizing an image or text displayed in the above-described manner, even if a screen displayed on the display 340 is provided by a third party rather than by the user terminal 3 (e.g., vehicle) itself, required information may be obtained from the corresponding screen.

The controller 360 may transmit screen information to the dialogue management system 1 through the communication module 310. The screen information is information included in a screen displayed on the display 340, and may include text recognized by the text recognizer 370. Also, if an image is recognized by the text recognizer 370, the screen information may include recognized image information as well.

For example, as shown in FIG. 7, the controller 360 may transmit a user's speech together with screen information to the dialogue management system 1. In this case, the transmitted screen information may be information about a screen displayed at a point in time that the user's speech is input to the microphone 320.

As another example, if a user's speech is input, the controller 360 may transmit the user's speech to the dialogue management system 1 first, and then if a request for screen information is received from the dialogue management system 1, the controller 360 may transmit the screen information to the dialogue management system 1.

Figure 8:
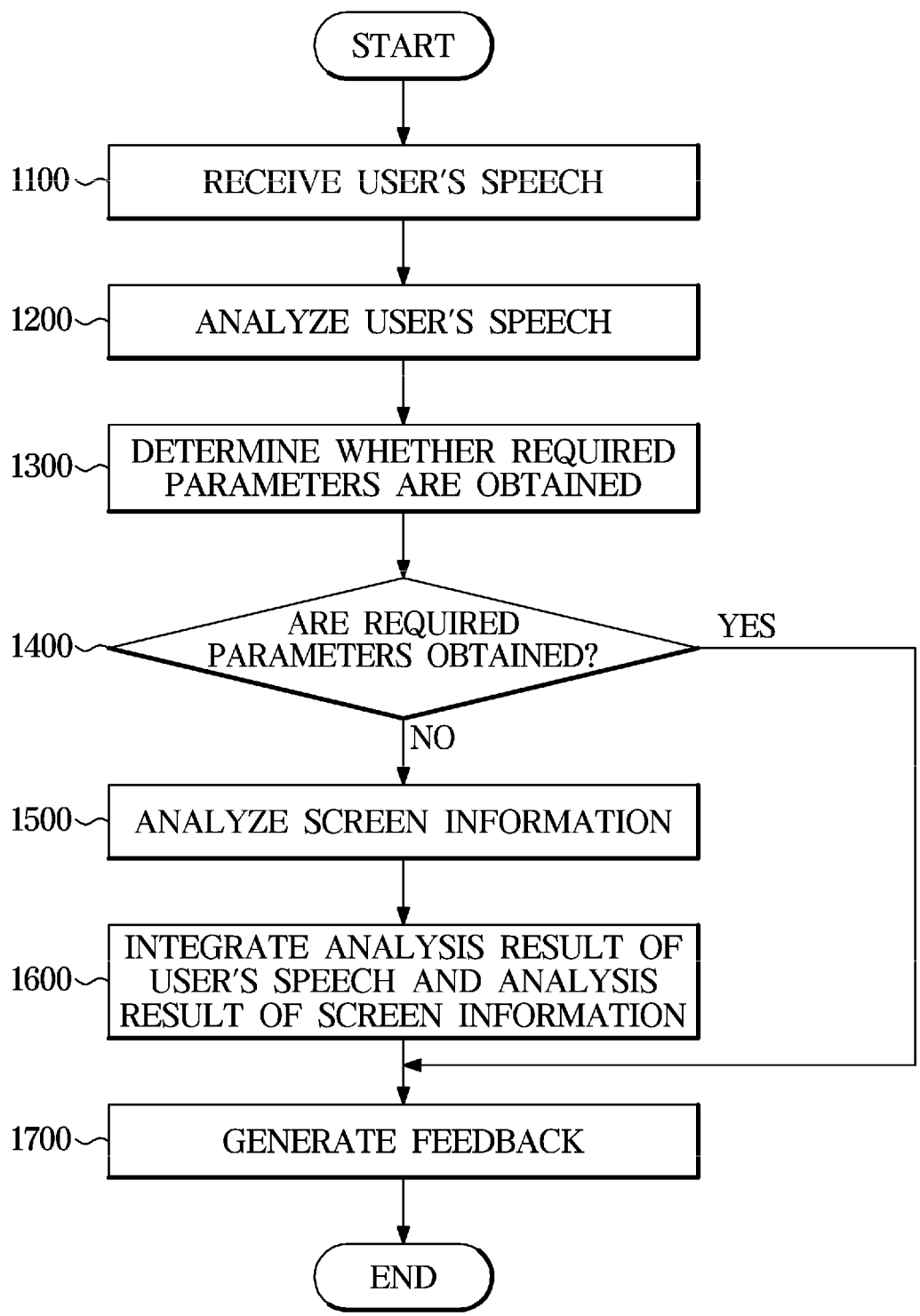
FIG. 8 shows an example of a flowchart showing steps of a dialogue management method.

FIG. 8 shows an example of a flowchart showing steps of a dialogue management method. Hereinafter, examples of the dialogue management system 1 and the dialogue management method are described together.

The dialogue management method may be performed by the dialogue management system 1. Accordingly, a description on the above-described examples of the dialogue management system 1 is applicable to examples of the dialogue management method, and a description on the dialogue management method to be described below may be applied to examples of the dialogue management system 1, even if not specifically described.

Referring to FIG. 8, in the dialogue management method, a user's speech is received from the user terminal 3 (step 1100).

The communication module 220 of the dialogue management system 1 may receive the user's speech. The received user's speech may be a voice signal, or text converted from a voice signal. A form of the user's speech transmitted to the dialogue management system 1 may be different depending on whether a speech recognition module is provided in the user terminal 3.

The dialogue management system 1 analyzes the received user's speech (step 1200).

If the user's speech is received in a form of voice signal, the speech recognition module 110 of the dialogue management system 1 may convert the voice signal into text.

The natural language understanding module 120 may perform domain classification, intent classification and slot tagging by applying a natural language understanding technology to the text converted from the user's speech.

For example, if the user's speech is "give me directions to a free road", a domain may be classified as [navigation], an intent may be classified as [route guidance], and [free road] may be tagged in a slot representing a road type.

As another example, if the user's speech is "set the seat heater to the level 2", a domain may be classified as [vehicle control], an intent may be classified as [seat heater setting], and [level 2] may be tagged in a slot representing a degree of seat heater.

Meanwhile, if the speech recognition module 110 or the natural language understanding module 120 is not included in the dialogue management system 1, an operation of analyzing the user's speech may be omitted. In this case, an analysis result of the user's speech may be provided from the speech recognition system 2.

The dialogue management module 130 determines whether all required parameters are obtained from the user's speech (step 1300).

The dialogue management module 130 may determine whether all the required parameters are obtained based on the analysis result of the user's speech, i.e., results of domain classification, intent classification and slot tagging.

As described above, the required parameter is a parameter required for executing a task corresponding to an intent. For example, if an intent is [route guidance], a required parameter may be a destination, and an optional parameter may be a road type such as a free road, expressway, a shortest path, and the like.

A slot for an intent may be filled with a required parameter or an optional parameter. As described above, even though a slot corresponding to an optional parameter is not filled, a task is executable with a default value, and if a slot corresponding to a required parameter is not filled, a task may not be executed. Hereinafter, for convenience of description, in the below-described example, a slot corresponding to an optional parameter is referred to as an optional slot, and a slot corresponding to a required parameter is referred to as a required slot.

Accordingly, the dialogue management module 130 determines whether all the required slots are filled, i.e., whether all the required parameters are obtained from the user's speech.

If all the required parameters are not obtained (No in operation at step 1400), screen information of the user terminal 3 may be analyzed (step 1500).

As shown in FIG. 7, if the screen information of the user terminal 3 is transmitted together with the user's speech, the screen information transmitted together with the user's speech may be analyzed.

Alternatively, if only the user's speech is transmitted from the user terminal 3, the dialogue management system 1 may request the user terminal 3 for screen information.

Meanwhile, although an example where the text recognizer 370 is included in the user terminal 3 has been described in the above-described example, according to examples, a text recognizer may be included in the dialogue management system 1. In this case, the user terminal 3 may transmit a scan image obtained by scanning a screen displayed on the display 340, and the dialogue management system 1 may obtain text from the transmitted scan image using the text recognizer.

Analysis of the screen information may be performed by the natural language understanding module 120. The natural language understanding module 120 may perform slot tagging on the text included in the screen information. The natural language understanding module 120 may also perform domain classification or intent classification.

The dialogue management module 130 integrates the analysis result of the user's speech and the analysis result of the screen information (step 1600).

The dialogue management module 130 may obtain a required parameter from the analysis result of the screen information, and fill an empty required slot among the analysis result of the user's speech using the obtained required parameter.

Also, depending on circumstances, an optional parameter may be obtained from the analysis result of the screen information, and an empty optional slot among the analysis result of the user's speech may be filled using the obtained optional parameter.

The dialogue management module 130 may generate a feedback on the user's speech based on a result of integrating the analysis result of the user's speech and the analysis result of the screen information (step 1700).

If a required parameter is obtained from the screen information, a task corresponding to an intent may be executed. Accordingly, the dialogue management module 130 may generate, as a feedback, a signal for executing the corresponding task and a system speech notifying the execution of the corresponding task.

If a required parameter is not obtained from the screen information, a task corresponding to an intent may not be executed. Accordingly, the dialogue management module 130 may generate, as a feedback, a system speech for obtaining a required parameter from a user.

Meanwhile, if all the required parameters are obtained from the user's speech (Yes in operation at step 1400), a feedback may be generated without analyzing the screen information (step 1700).

Hereinafter, detailed examples of the above-described dialogue management system 1 and dialogue management method are described.

Figure 9:
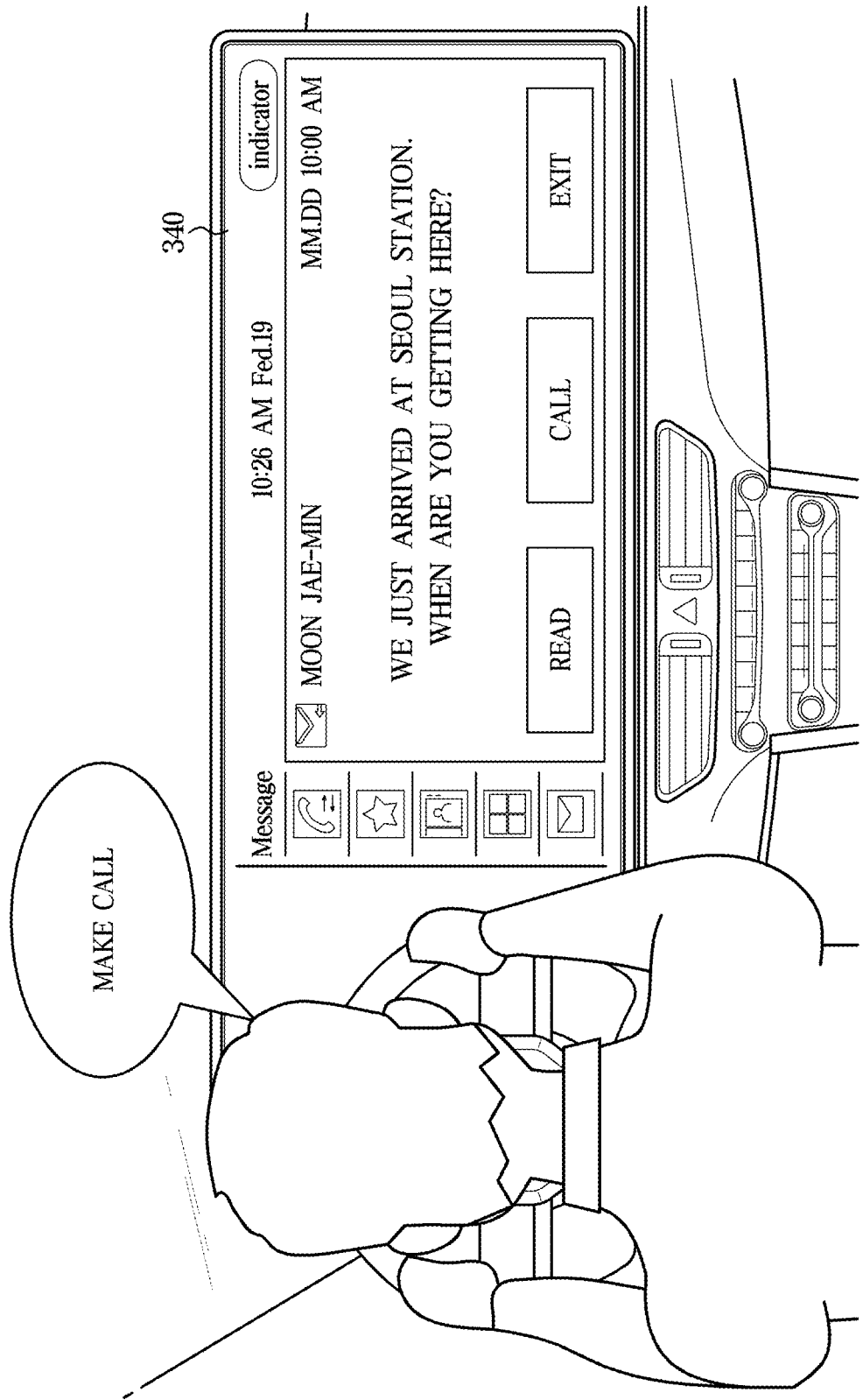
FIG. 9 shows an example of a user's speech input to a user terminal and a screen displayed on the user terminal.

FIG. 9 shows an example of a user's speech input to a user terminal and a screen displayed on the user terminal. FIG. 10 shows an example analysis result of a user's speech and an analysis result of screen information performed in a dialogue management system.

As shown in FIG. 9, a user may input a user's speech, for example, "make a call".

If the user's speech is input, the user terminal 3 (e.g., vehicle) may transmit the user's speech to the dialogue management system 1 through the communication module 310.

The dialogue management system 1 may perform domain classification, intent classification and slot tagging by analyzing the user's speech transmitted from the user terminal 3 (e.g., vehicle). An analysis result of the user's speech of "make a call" is shown in FIG. 10.

Specifically, the speech recognition module 110 may convert the user's speech into text, and the natural language understanding module 120 may perform domain classification, intent classification and slot tagging on the text converted from the user's speech.

For the user's speech of "make a call", a domain may be classified as [call], an intent may be classified as [making a call], and it may be determined that no slot extracted from the user's speech exist.

The dialogue management module 130 may receive the analysis result from the natural language understanding module 120. The dialogue management module 130 may determine whether a required parameter required for task execution is obtained based on the transmitted analysis result. A required parameter for executing a task of 'making a call' corresponds to a recipient. In the instant example, however, information about a recipient has not been obtained from the user's speech.

Accordingly, in order to obtain a required parameter, the dialogue management module 130 may analyze screen information of the user terminal 3 (e.g., vehicle). As described above, if the screen information of the user terminal 3 (e.g., vehicle) has been already transmitted together with the user's speech, the transmitted screen information may be analyzed, and if the screen information has not been transmitted, the dialogue management system 1 may request the user terminal 3 (e.g., vehicle) for the screen information and receive the screen information.

Referring again to FIG. 9, on the display 340 of the user terminal 3 (e.g., vehicle) at the time that the user's speech is input, a text message transmitted from a sender 'MOON JAE-MIN' is already displayed. In addition to the above, because various texts are already displayed on the display 340, the controller 360 may scan the screen displayed on the display 340 and transmit the scanned image (scan image) to the dialogue management system 1, or transmit text recognized by the text recognizer 370 to the dialogue management system 1.

The natural language understanding module 120 of the dialogue management system 1 may analyze the screen information transmitted from the user terminal 3 (e.g., vehicle). Referring to FIG. 10, entity tagging may be performed on various texts included in the screen information to classify into respective entity types.

For example, among texts included in the screen information, "10:26 AM" may be classified as hour and minute, "Feb. 19" may be classified as month and day, "MOON JAE-MIN" may be classified as a name, and "Seoul station" may be classified as point of interest (POI).

Figure 12:
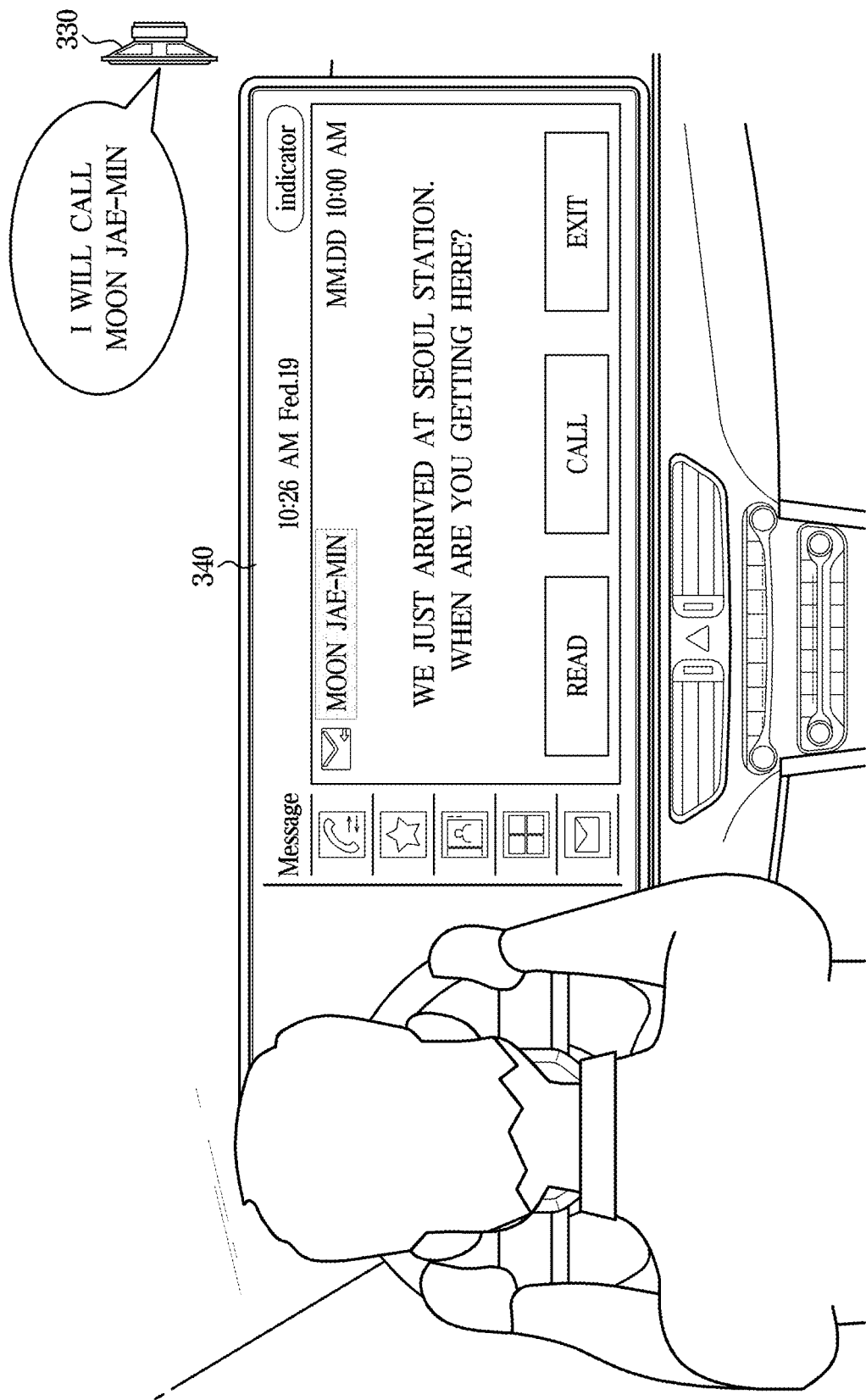
FIG. 12 shows an example of displaying use of screen information through a user terminal.

FIG. 11 shows an example result of integrating an analysis result of a user's speech and an analysis result of screen information performed in a dialogue management system. FIG. 12 shows an example of displaying use of screen information through a user terminal.

The dialogue management module 130 may integrate an analysis result of a user's speech and an analysis result of screen information. Referring to FIG. 11, a required parameter for executing a task of 'making a call' is a recipient, and information corresponding to the recipient is "MOON JAE-MIN" classified as a name, in the analysis result of screen information.

Accordingly, the dialogue management module 130 may fill a required slot required for executing the task of 'making a call', by using "MOON JAE-MIN".

Meanwhile, if image information is included in the screen information provided from the user terminal 3, the dialogue management module 130 may use the image information together, if slot filling is performed. For example, if a plurality of texts that may be a recipient exist in the screen information, text to be used for slot filling may be selected based on image information around the text. Specifically, if a plurality of texts that may be a recipient exist in the screen information and as shown in FIG. 9, an image representing a message is displayed next to one of the plurality of texts, the text displayed next to the corresponding image may be selected as a recipient. Alternatively, text to be used for slot filling may be selected based on a position of the text on the screen.

The dialogue management module 130 may generate a feedback for task execution. The generated feedback may include a system response notifying the task execution and a signal notifying that the screen information displayed on the display 340 has been used.

The generated feedback may be transmitted to the user terminal 3 through the communication module 220. The controller 360 of the user terminal 3 may control the display 340 or the speaker 330 based on the transmitted feedback.

For example, as shown in FIG. 12, a system response like "I will call MOON JAE-MIN" may be output through the speaker 330, and also "MOON JAE-MIN" may be highlighted on the display 340 in order to indicate that information that a recipient is "MOON JAE-MIN" has been obtained from a screen displayed on the display 340. For example, "MOON JAE-MIN" may be highlighted, underlined, bolded, displayed in a different color, or displayed inside a square or circle. A way of highlighting the text used for slot filling is not limited thereto.

Figure 13:
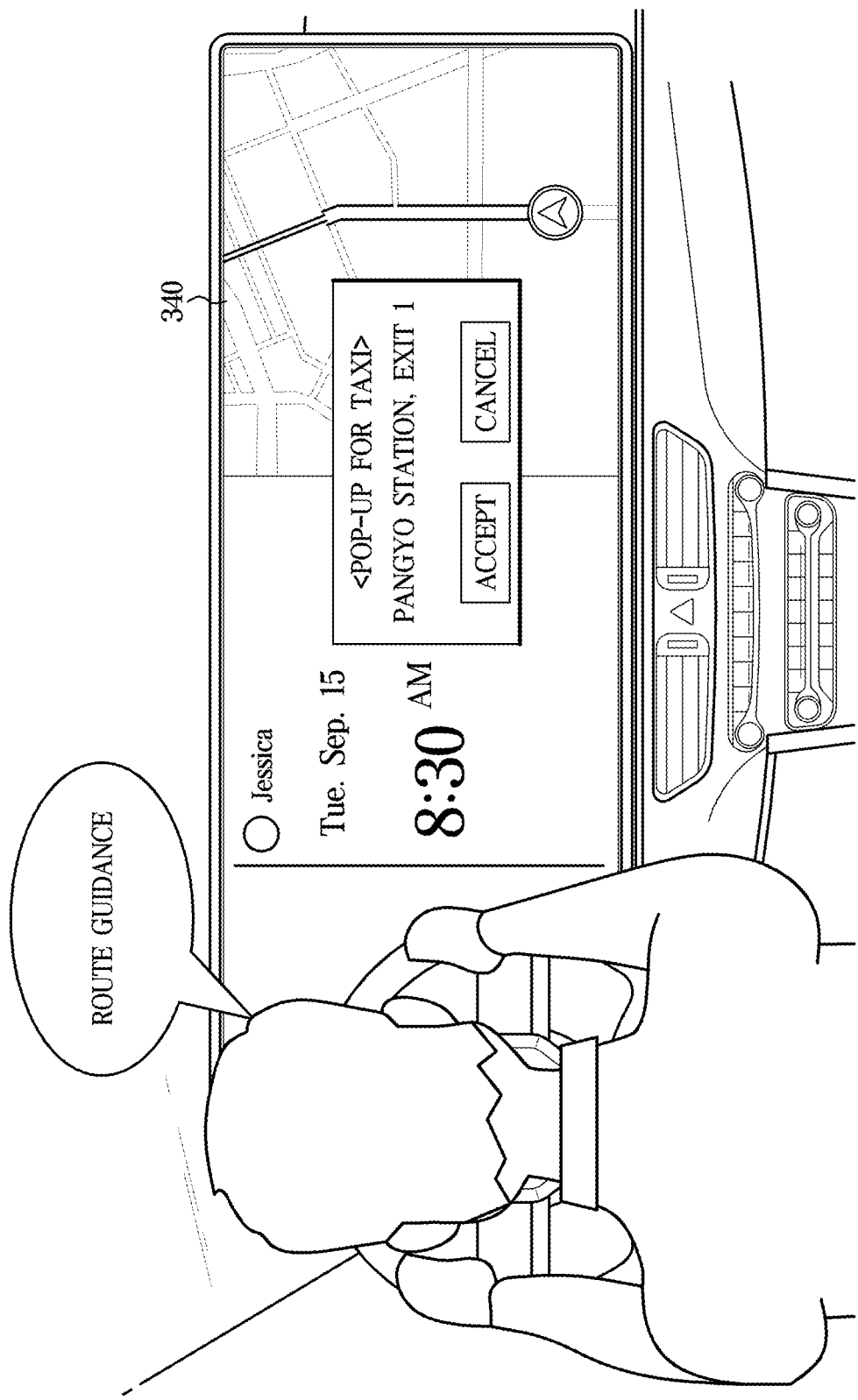
FIG. 13 shows another example of a user's speech input to a user terminal and a screen displayed on the user terminal.

FIG. 13 shows another example of a user's speech input to a user terminal and a screen displayed on the user terminal. FIG. 14 shows an example analysis result of a user's speech and an analysis result of screen information performed in a dialogue management system.

As shown in FIG. 13, a user inputs a user's speech, for example, "route guidance", to the microphone 320 of the user terminal 3.

If the user's speech is input, the user terminal 3 may transmit the user's speech to the dialogue management system 1 through the communication module 310.

The dialogue management system 1 may perform domain classification, intent classification and slot tagging by analyzing the user's speech transmitted from the user terminal 3. An analysis result of the user's speech of "route guidance" is shown in FIG. 14.

Specifically, the speech recognition module 110 may convert the user's speech into text, and the natural language understanding module 120 may perform domain classification, intent classification and slot tagging on the text converted from the user's speech.

For the user's speech of "route guidance", a domain may be classified as [navigation], an intent may be classified as [route guidance], and it may be determined that no slot extracted from the user's speech exist.

The dialogue management module 130 may receive the analysis result from the natural language understanding module 120. The dialogue management module 130 may determine whether a required parameter required for task execution is obtained based on the transmitted analysis result. A required parameter for executing a task of 'route guidance' corresponds to a destination. In the instant example, however, information about a destination has not been obtained from the user's speech.

Accordingly, in order to obtain a required parameter, the dialogue management module 130 may analyze screen information of the user terminal 3. As described above, if the screen information of the user terminal 3 has been already transmitted together with the user's speech, the transmitted screen information may be analyzed, and if the screen information has not been transmitted, the dialogue management system 1 may request the user terminal 3 for the screen information and receive the screen information.

Referring again to FIG. 13, on the display 340 of the user terminal 3 at the time that the user's speech is input, a pop-up message for taxi is already displayed. In addition to the above, because various texts are already displayed on the display 340, the controller 360 may scan the screen displayed on the display 340 and transmit the scanned image (scan image) to the dialogue management system 1, or transmit text recognized by the text recognizer 370 to the dialogue management system 1.

The natural language understanding module 120 of the dialogue management system 1 may analyze the screen information transmitted from the user terminal 3. Referring to FIG. 14, entity tagging may be performed on various texts included in the screen information to classify into respective entity types.

For example, among texts included in the screen information, "Jessica" may be classified as a name, "8:30" may be classified as hour and minute, "Pangyo station, exit 1" may be classified as a point of interest (POI).

Figure 16:
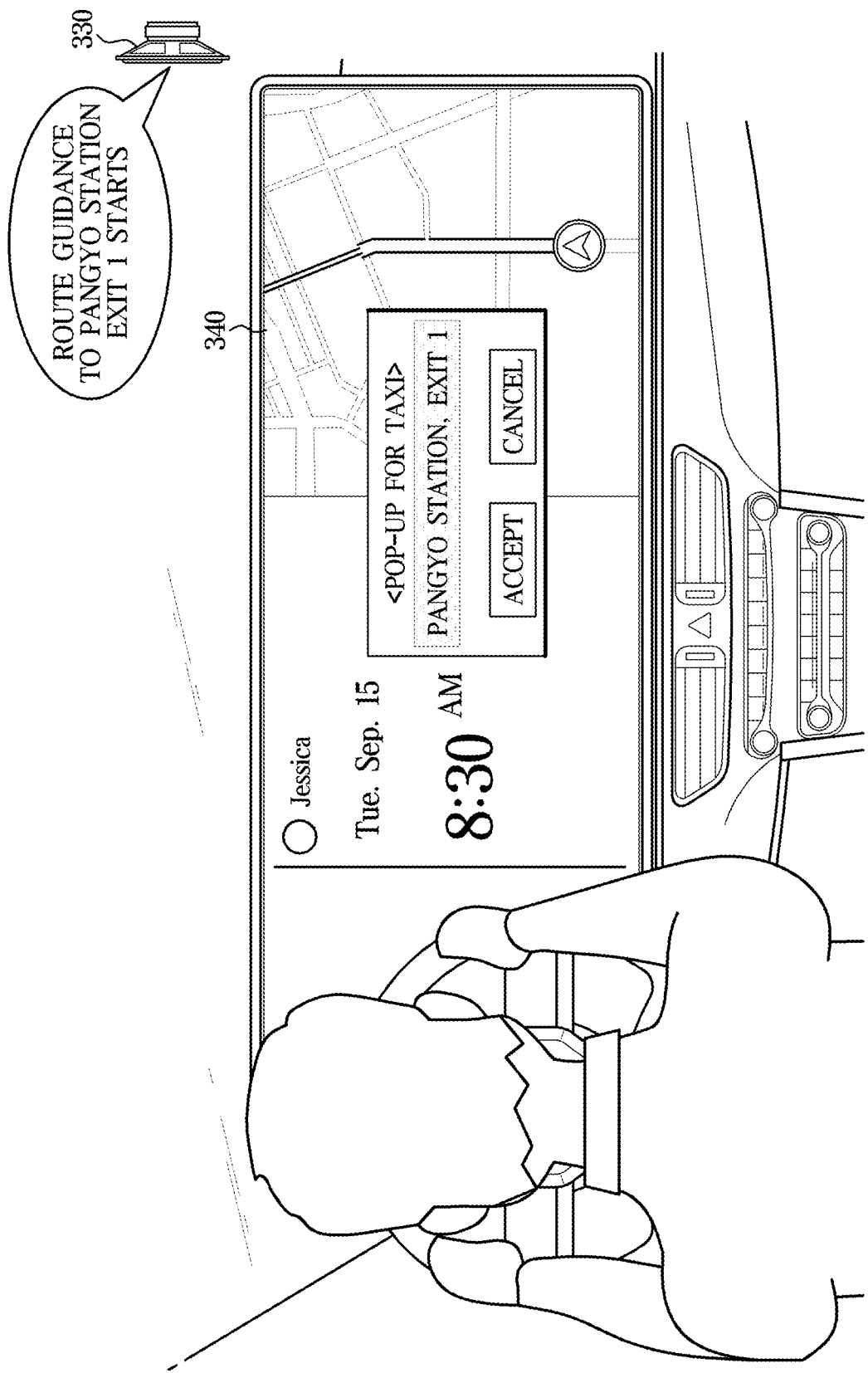
FIG. 16 shows another example of displaying use of screen information through a user terminal.

FIG. 15 shows an example result of integrating an analysis result of a user's speech and an analysis result of screen information performed in a dialogue management system. FIG. 16 shows another example of displaying use of screen information through a user terminal.

The dialogue management module 130 may integrate an analysis result of a user's speech and an analysis result of screen information. Referring to FIG. 15, a required parameter for executing a task of 'route guidance' is a destination, and information corresponding to the destination is "Pangyo station, exit 1" classified as a POI, in the analysis result of screen information.

Accordingly, the dialogue management module 130 may fill a required slot required for executing the task of 'route guidance', by using "Pangyo station, exit 1".

The dialogue management module 130 may generate a feedback for task execution. The generated feedback may include a system response notifying the task execution and a signal notifying that the screen information displayed on the display 340 has been used.

The generated feedback may be transmitted to the user terminal 3 through the communication module 220. The controller 360 of the user terminal 3 may control the display 340 or the speaker 330 based on the transmitted feedback.

For example, as shown in FIG. 16, a system response like "route guidance to Pangyo station exit 1 starts" may be output through the speaker 330, and also "Pangyo station, exit 1" may be highlighted on the display 340 in order to indicate that information that a destination is "Pangyo station, exit 1" has been obtained from a screen displayed on the display 340.

Figure 17:
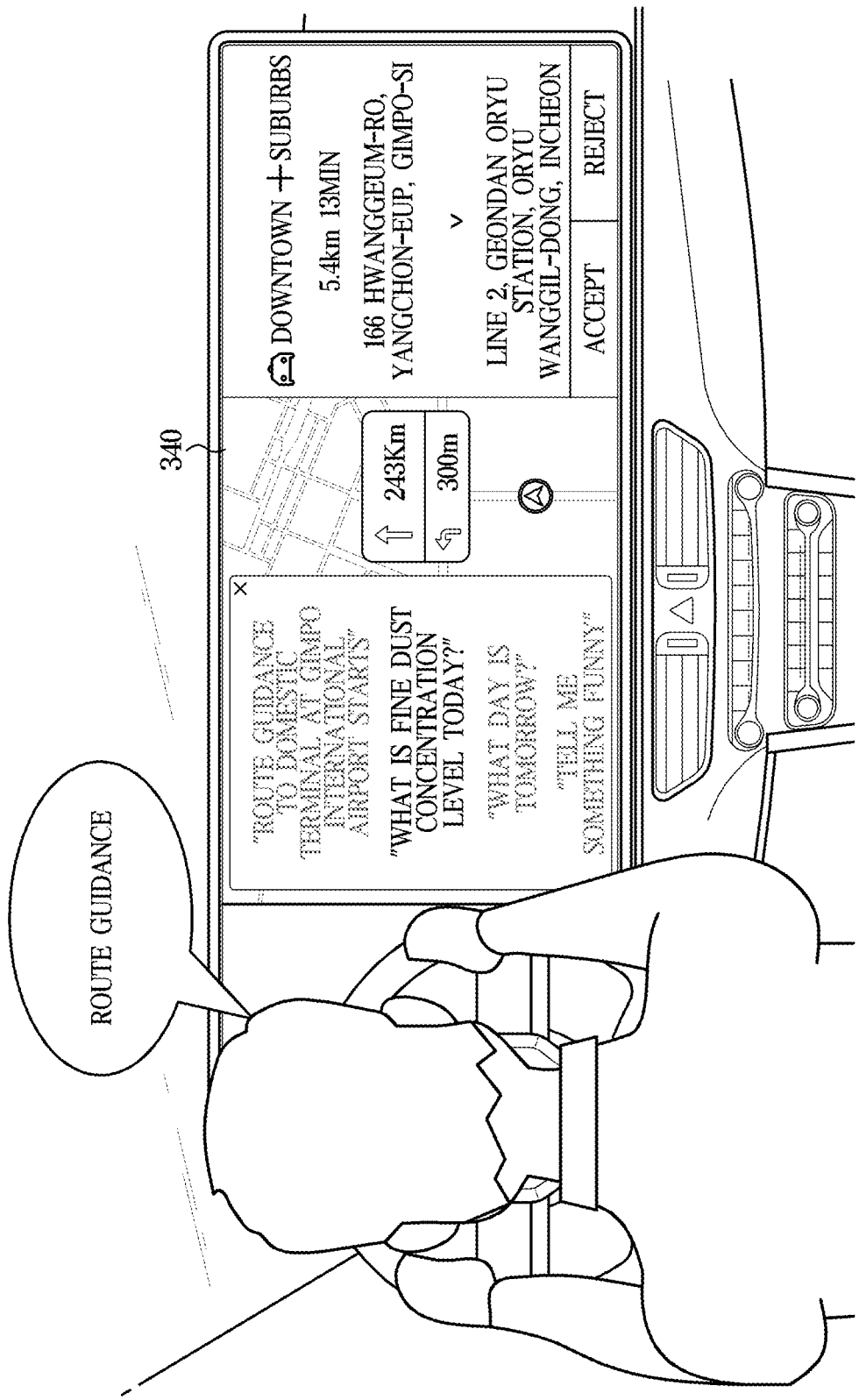
FIG. 17 shows another example of a user's speech input to a user terminal and a screen displayed on the user terminal.

FIG. 17 shows another example of a user's speech input to a user terminal and a screen displayed on the user terminal. FIG. 18 shows an example analysis result of a user's speech and an analysis result of screen information performed in a dialogue management system.

As shown in FIG. 17, a user may input a user's speech, for example, "route guidance", to the microphone 320 of the user terminal 3.

If the user's speech is input, the user terminal 3 may transmit the user's speech to the dialogue management system 1 through the communication module 310.

The dialogue management system 1 may perform domain classification, intent classification and slot tagging by analyzing the user's speech transmitted from the user terminal 3. An analysis result of the user's speech of "route guidance" is shown in FIG. 18.

For the user's speech of "route guidance", a domain may be classified as [navigation], an intent may be classified as [route guidance], and it may be determined that no slot extracted from the user's speech exist.

The dialogue management module 130 may receive the analysis result from the natural language understanding module 120. The dialogue management module 130 may determine whether a required parameter required for task execution is obtained based on the transmitted analysis result. A required parameter for executing a task of 'route guidance' corresponds to a destination. In the instant example, however, information about a destination has not been obtained from the user's speech.

Accordingly, in order to obtain a required parameter, the dialogue management module 130 may analyze screen information of the user terminal 3. Referring again to FIG. 17, on the display 340 of the user terminal 3 at the time that the user's speech is input, a navigation screen is already displayed. In addition to the above, because various texts are already displayed on the display 340, the controller 360 may generate a scan image by scanning the screen displayed on the display 340, and transmit the scan image to the dialogue management system 1, or transmit text recognized by the text recognizer 370 to the dialogue management system 1.

The natural language understanding module 120 of the dialogue management system 1 may analyze the screen information transmitted from the user terminal 3. Referring to FIG. 18, entity tagging may be performed on various texts included in the screen information to classify into respective entity types.

For example, among texts included in the screen information, "domestic terminal at the Gimpo international airport" may be classified as a POI, "fine dust" may be classified as weather, and "166 Hwanggeum-ro, Yangchon-eup, Gimpo-si" and "Line 2, Geondan Oryu station, Oryu Wanggil-dong, Incheon" may be classified as an address.

Figure 20:
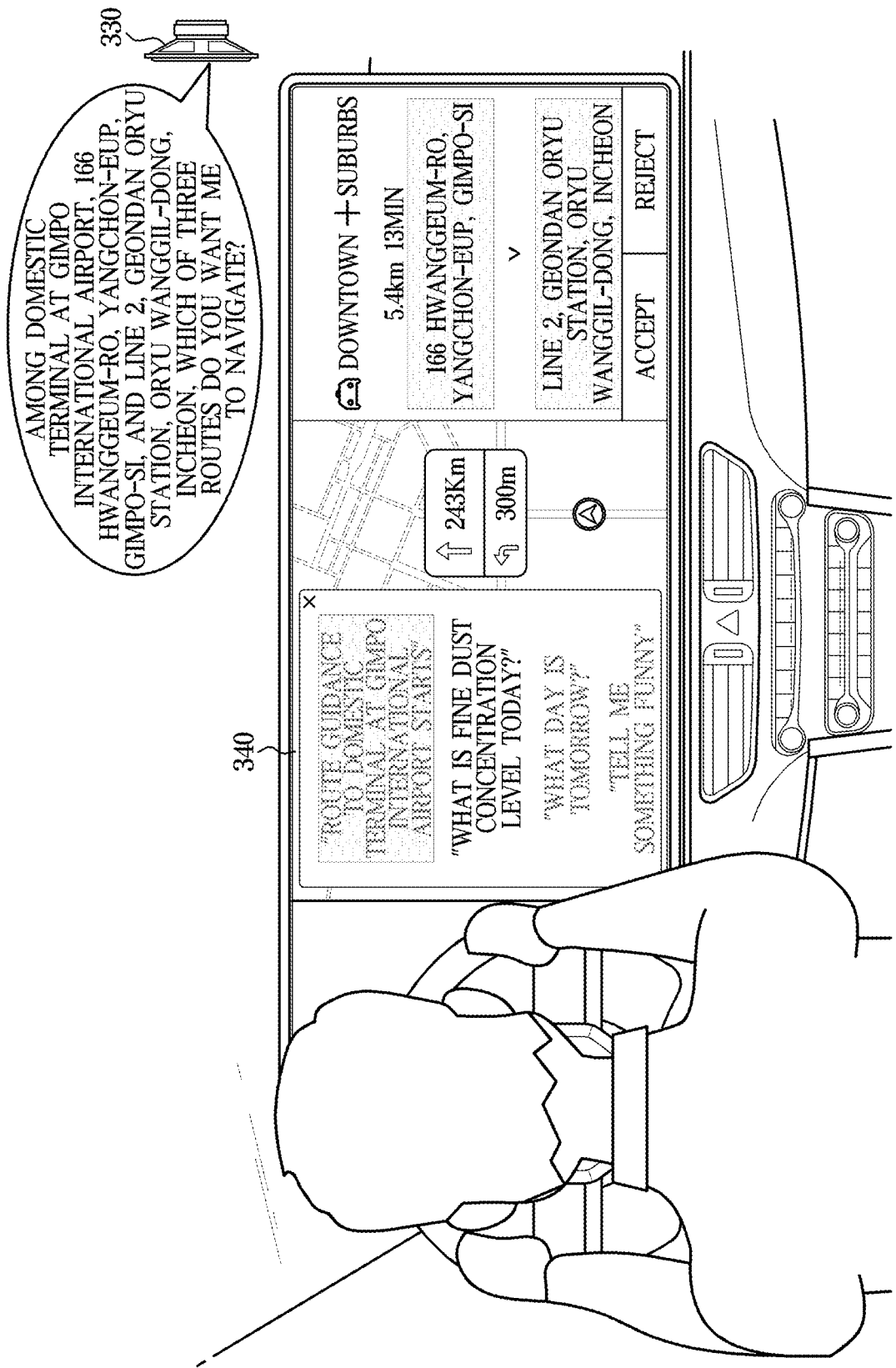
FIG. 20 shows another example of displaying use of screen information through a user terminal.

FIG. 19 shows an example result of integrating an analysis result of a user's speech and an analysis result of screen information performed in a dialogue management system. FIG. 20 shows another example of displaying use of screen information through a user terminal.

The dialogue management module 130 may integrate an analysis result of a user's speech and an analysis result of screen information. Referring to FIG. 19, a required parameter for executing a task of 'route guidance' is a destination, and in the analysis result of screen information, information corresponding to the destination is "domestic terminal at the Gimpo international airport" classified as a POI, and "166 Hwanggeum-ro, Yangchon-eup, Gimpo-si" and "Line 2, Geondan Oryu station, Oryu Wanggil-dong, Incheon" which are classified as an address.

Accordingly, the dialogue management module 130 may fill a required slot required for executing the task of 'route guidance', by using one of the "domestic terminal at the Gimpo international airport", "166 Hwanggeum-ro, Yangchon-eup, Gimpo-si" and "Line 2, Geondan Oryu station, Oryu Wanggil-dong, Incheon".

The dialogue management module 130 may generate a feedback for task execution. The generated feedback may include a system response for inducing a selection of one from the three candidate parameters obtained from the screen information, and a signal notifying that the screen information displayed on the display 340 has been used.

The generated feedback may be transmitted to the user terminal 3 through the communication module 220. The controller 360 of the user terminal 3 may control the display 340 or the speaker 330 based on the transmitted feedback.

For example, as shown in FIG. 20, a system response like "among 'domestic terminal at the Gimpo international airport', '166 Hwanggeum-ro, Yangchon-eup, Gimpo-si' and 'Line 2, Geondan Oryu station, Oryu Wanggil-dong, Incheon', which of the three routes do you want me to navigate?" may be output through the speaker 330 or via pop-up message on the display 340. Furthermore, "domestic terminal at the Gimpo international airport", "166 Hwanggeum-ro, Yangchon-eup, Gimpo-si" and "Line 2, Geondan Oryu station, Oryu Wanggil-dong, Incheon" may be highlighted on the display 340 in order to indicate that the three candidate parameters have been obtained from a screen displayed on the display 340.

Alternatively, one of the candidate parameters may be selected by the dialogue management module 130 to recommend to a user. For example, the dialogue management module 130 may select one from the candidate parameters based on a user's navigation history. In this case, a parameter included in a recent navigation history or a parameter with a highest frequency may be recommended first from among the candidate parameters.

Alternatively, one of the candidate parameters may be recommended based on an image around a text or a position of a text in a screen.

According to the dialogue management system and the dialogue management method described above, even if a required parameter is not included in a user's speech, the required parameter may be obtained from screen information displayed on a user terminal, preventing user inconvenience caused by additional speech required and improving usability of speech recognition.

Furthermore, screen scanning and text recognition may be used in obtaining screen information from the user terminal, and thus information provided by a third party may also be used in the dialogue management system.

An example of the disclosure provides a method, a dialogue management system and a non-transitory computer-readable recording medium that may obtain information required for executing a task corresponding to a user's speech from a screen displayed on a user terminal, thereby omitting operations of inducing, receiving, and analyzing additional user speeches, and the like.

Additional examples of the disclosure will be set forth in part in the description which follows and, in part, will be obvious from the description, or may be learned by practice of the disclosure.

According to an example of the disclosure, a method may include: obtaining, by a communication module, an intent classification result and a slot tagging result from a user's speech; determining whether at least one parameter used for executing a task corresponding to the intent classification result has been obtained; analyzing, based on determining that the at least one parameter has not been obtained, screen information displayed via a user terminal; integrating a result of the analyzing the screen information, the intent classification result, and the slot tagging result; and generating, based on the integrating, feedback information on the user's speech.

The analyzing the screen information may include performing entity tagging on a text included in the screen information to determine a text classification for the text.

The integrating may include: obtaining the at least one parameter from the analyzing the screen information; and storing, based on the obtaining the at least one parameter, slot data required to execute the task corresponding to the intent classification result.

The at least one parameter may include a required parameter used to execute the task.

The screen information may include a text obtained by performing text recognition on a scan image generated by scanning the screen information displayed via the user terminal.

The analyzing screen information may further include obtaining a text by performing text recognition on the screen information.

The generating the feedback may include generating a signal for displaying a text corresponding to a parameter used for storing the slot among text information included in the screen information.

According to an example of the disclosure, a dialogue management system may include: a communication module configured to receive an intent classification result and a slot tagging result from a user's speech; and at least one processor configured to: determine whether at least one parameter used for executing a task corresponding to the intent classification result has been obtained; analyze, based on a determination that the at least one parameter has not been obtained, screen information displayed via a user terminal; integrate the analyzed screen information, the intent classification result, and the slot tagging result; and generate, based on the integration, feedback information on the user's speech.

The at least one processor may be further configured to perform entity tagging on a text included in the screen information to determine a text classification for the text.

The at least one processor may be further configured to obtain the at least one parameter from the analyzed screen information, and store, based on the obtained at least one parameter, slot data required to execute the task corresponding to the intent classification result.

The at least one parameter may include a required parameter used to execute the task.

The screen information may include a text obtained by performing text recognition on a scan image generated by scanning the screen information displayed via the user terminal.

The at least one processor may be further configured to obtain a text by performing text recognition on the screen information.

The at least one processor may be further configured to generate a signal for displaying a text corresponding to a parameter used to store the slot data among text information included in the screen information.

According to an aspect of the disclosure, a non-transitory computer-readable recording medium storing a program that, when executed, cause: obtaining an intent classification result and a slot tagging result from a user's speech; determining whether at least one parameter used for executing a task corresponding to the intent classification result has been obtained; analyzing, based on determining that the at least one parameter has not been obtained, screen information displayed via a user terminal; integrating a result of the analyzing the screen information, the intent classification result and the slot tagging result; and generating, based on the integrating, feedback information on the user's speech.

The analyzing the screen information may include performing entity tagging on a text included in the screen information to determine a text classification for the text.

The integrating may include: obtaining the at least one parameter from the analyzing the screen information; and storing, based on the obtaining the at least one parameter, slot data required to execute the task corresponding to the intent classification result.

The at least one parameter may include a required parameter used to execute the task.

The screen information may include a text obtained by performing text recognition on a scan image generated by scanning the screen information displayed via the user terminal.

The analyzing the screen information may further include obtaining a text by performing text recognition on the screen information.

The generating of the feedback information may include generating a signal for displaying a text corresponding to a parameter used for storing the slot data among text information included in the screen information.

As is apparent from the above, according to the examples of the disclosure, if a user may not smoothly input a user's speech, a dialogue management method, a dialogue management system and computer-readable recording medium may provide appropriate recommended speech information according to a specific speech pattern included in user's speeches, thereby guiding the user to smooth speeches.

Meanwhile, the above-described dialogue management method may be implemented in the form of a recording medium storing computer-executable instructions. The instructions may be stored in the form of a program code, and if executed by a processor, the instructions may perform operations of the disclosed examples.

The recording medium may be implemented as a computer-readable recording medium, and may be a non-transitory computer-readable medium.

The computer-readable recording medium includes all kinds of recording media in which instructions which may be decoded by a computer are stored of, for example, a read only memory (ROM), random access memory (RAM), magnetic tapes, magnetic disks, flash memories, optical recording medium, and the like.

Although examples have been described for illustrative purposes, those skilled in the art will appreciate that various modifications, additions and substitutions are possible, without departing from the scope and spirit of the disclosure. Therefore, examples have not been described for limiting purposes.

What is claimed is:

1. A method performed by a dialogue management system, the method comprising:
 obtaining an intent classification result and a slot tagging result from a user's speech;
 determining whether at least one parameter used for executing a task corresponding to the intent classification result has been obtained;
 analyzing, based on determining that the at least one parameter has not been obtained, screen information displayed via a user terminal;
 integrating a result of the analyzing the screen information, the intent classification result, and the slot tagging result; and
 generating, based on the integrating, feedback information on the user's speech.

2. The method of claim 1, wherein the analyzing the screen information comprises performing entity tagging on a text included in the screen information to determine a text classification for the text.

3. The method of claim 1, wherein the integrating comprises:
 obtaining the at least one parameter from the analyzing the screen information; and
 storing, based on the obtaining the at least one parameter, slot data required to execute the task corresponding to the intent classification result.

4. The method of claim 3, wherein the generating the feedback information comprises generating a signal for displaying a text corresponding to a parameter used for the storing the slot data among text information included in the screen information.

5. The method of claim 1, wherein the at least one parameter includes a required parameter used to execute the task.

6. The method of claim 1, wherein the screen information includes a text obtained by performing text recognition on a scan image generated by scanning the screen information displayed via the user terminal.

7. The method of claim 1, wherein the analyzing the screen information further comprises obtaining a text by performing text recognition on the screen information.

8. A dialogue management system comprising:
 a communication module configured to receive an intent classification result and a slot tagging result from a user's speech; and
 at least one processor configured to:
  determine whether at least one parameter used for executing a task corresponding to the intent classification result has been obtained;
  analyze, based on a determination that the at least one parameter has not been obtained, screen information displayed via a user terminal;
  integrate the analyzed screen information, the intent classification result, and the slot tagging result; and
  generate, based on the integration, feedback information on the user's speech.

9. The dialogue management system of claim 8, wherein the at least one processor is further configured to perform entity tagging on a text included in the screen information to determine a text classification for the text.

10. The dialogue management system of claim 8, wherein the at least one processor is further configured to obtain the at least one parameter from the analyzed screen information, and store, based on the obtained at least one parameter, slot data required to execute the task corresponding to the intent classification result.

11. The dialogue management system of claim 10, wherein the at least one processor is further configured to generate a signal for displaying a text corresponding to a parameter used to store the slot data among text information included in the screen information.

12. The dialogue management system of claim 8, wherein the at least one parameter includes a required parameter used to execute the task.

13. The dialogue management system of claim 8, wherein the screen information includes a text obtained by performing text recognition on a scan image generated by scanning the screen information displayed via the user terminal.

14. The dialogue management system of claim 8, wherein the at least one processor is further configured to obtain a text by performing text recognition on the screen information.

15. A non-transitory computer-readable recording medium storing a program that, when executed, cause:
- obtaining an intent classification result and a slot tagging result from a user's speech;
- determining whether at least one parameter used for executing a task corresponding to the intent classification result has been obtained;
- analyzing, based on determining that the at least one parameter has not been obtained, screen information displayed via a user terminal;
- integrating a result of the analyzing the screen information, the intent classification result, and the slot tagging result; and
- generating, based on the integrating, feedback information on the user's speech.

16. The non-transitory computer-readable recording medium of claim 15, wherein the analyzing the screen information comprises performing entity tagging on a text included in the screen information to determine a text classification for the text.

17. The non-transitory computer-readable recording medium of claim 15, wherein the integrating comprises:
- obtaining the at least one parameter from the analyzing the screen information; and
- storing, based on the obtaining the at least one parameter, slot data required to execute the task corresponding to the intent classification result.

18. The non-transitory computer-readable recording medium of claim 15, wherein the at least one parameter includes a required parameter used to execute the task.

19. The non-transitory computer-readable recording medium of claim 15, wherein the screen information includes a text obtained by performing text recognition on a scan image generated by scanning the screen information displayed via the user terminal.

* * * * *